United States Patent
Boguraev et al.

(10) Patent No.: US 9,588,959 B2
(45) Date of Patent: Mar. 7, 2017

(54) EXTRACTION OF LEXICAL KERNEL UNITS FROM A DOMAIN-SPECIFIC LEXICON

(71) Applicant: International Business Machines Corporation, Armonk, NY (US)

(72) Inventors: Branimir K. Boguraev, New York, NY (US); Esme Manandise, Tallahassee, FL (US); Benjamin P. Segal, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 14/593,015

(22) Filed: Jan. 9, 2015

(65) Prior Publication Data
US 2016/0203119 A1    Jul. 14, 2016

(51) Int. Cl.
G06F 17/27 (2006.01)

(52) U.S. Cl.
CPC .......... *G06F 17/277* (2013.01); *G06F 17/271* (2013.01); *G06F 17/2705* (2013.01); *G06F 17/279* (2013.01); *G06F 17/2735* (2013.01); *G06F 17/2755* (2013.01)

(58) Field of Classification Search
None
See application file for complete search history.

(56) References Cited

U.S. PATENT DOCUMENTS

| | | | | |
|---|---|---|---|---|
| 7,627,562 B2* | 12/2009 | Kacmarcik | ........... | G06F 17/274 |
| 7,912,703 B2* | 3/2011 | Magdalen | ......... | G06F 17/30731 704/10 |
| 8,077,984 B2* | 12/2011 | Cancedda | .............. | G06K 9/627 382/290 |
| 8,595,245 B2* | 11/2013 | Cavestro | ........... | G06F 17/30014 707/758 |
| 2004/0128122 A1* | 7/2004 | Privault | .............. | G06F 17/2775 704/4 |

(Continued)

OTHER PUBLICATIONS

List of IBM Patents or Patent Applications Treated as Related; (Appendix P), Filed Feb. 13, 2015, 2 pages.

(Continued)

*Primary Examiner* — Douglas Godbold
(74) *Attorney, Agent, or Firm* — Cantor Colburn LLP; William Stock

(57) ABSTRACT

According to an aspect, a candidate lexical kernel unit that includes a word token sequence having two or more words is received. Domain terms that contain the two or more words are retrieved from a terminology resource file of domain terms associated with a domain. The candidate lexical kernel unit and the retrieved domain terms are analyzed to determine whether the candidate lexical kernel unit satisfies specified criteria for use as a building block by a natural-language processing (NLP) tool for building larger lexical units in the domain. Each of the larger lexical units includes a greater number of words than the candidate lexical kernel unit. The candidate lexical kernel unit is identified as a lexical kernel unit based on determining that the candidate lexical kernel unit satisfies the specified criteria. The lexical kernel unit is output to a domain-specific lexical kernel unit file for input to the NLP tool.

12 Claims, 6 Drawing Sheets

(56) References Cited

U.S. PATENT DOCUMENTS

2007/0067280 A1* 3/2007 Zhou .................. G06F 17/278
2014/0163968 A1* 6/2014 Ehsani ................ G10L 15/193
                                                              704/9
2015/0199333 A1* 7/2015 Nekhay ............... G06F 17/278
                                                              704/9

OTHER PUBLICATIONS

Branimir K. Boguraev et al., Pending U.S. Appl. No. 14/580,583, entitled "Domain-Specific Computational Lexicon Formation," filed with the U.S. Patent and Trademark Office on Dec. 23, 2014.
Mansjur et al., "Using Kernel Density Classifier with Topic Model and Cost Sensitive Learning for Automatic Text Categorization." Document Analysis and Recognition, 2009. ICDAR'09. 10th International Conference on. IEEE, 2009, 5 pages.
Wang et al. "A semantic pattern for restricted domain chinese question answering." Machine Learning and Cybernetics, 2009 International Conference on. vol. 3. IEEE, 2009, 6 pages.
Wible et al. "A computational approach to the discovery and representation of lexical chunks." The 13th Conference on Natural Language Processing (TALN 2006). 2006, 8 pages.
Zelenko et al., "Kernel Methods for Relation Extraction", EMNLP '02 Proceedings of the ACL-02 conference on Empirical methods in natural language processing—vol. 10 pp. 71-78, 8 pages.
Zhou et al. "Discover hierarchical lexical hyponymy relation from large-scale concept set." Cognitive Informatics, 2008. ICCI 2008. 7th IEEE International Conference on. IEEE, 2008, 10 pages.
Zhu et al., "Enriched Format Text Categorization Using a Component Similarity Approach." Journal of Software (1796217X) vol. 6, No. 9 (2011), 8 pages.
List of IBM Patents or Patent Applications Treated as Related; (Appendix P), Filed Jul. 12, 2016, 2 pages.
U.S. Appl. No. 14/639,410, filed Mar. 5, 2015, Entitled: Domain-Specific Computational Lexicon Formation, First Named Inventor: Branimir K. Boguraev.
U.S. Appl. No. 14/644,291, filed Mar. 11, 2015, Entitled: Extraction of Lexical Kernel Units from a Domain-Specific Lexicon, First Named Inventor: Branimir K. Boguraev.

* cited by examiner

EXTRACTION OF LEXICAL KERNEL UNITS FROM A DOMAIN-SPECIFIC LEXICON

BACKGROUND

The present disclosure relates generally to language processing, and more specifically, to extraction of multiword lexical kernel units from a domain-specific lexical resource.

Parsers are a fundamental stepping stone to many different types of natural-language processing (NLP) applications and tasks. One such type of system that relies upon a parser is a question-answering computer system. Question-answering computer systems typically employ NLP that returns a highest scoring answer to a question. For NLP techniques (also referred to as text analytics) to infer aspects of the meaning of terms and phrases, the use of a parser to analyze syntax, context, and usage is a crucial requirement.

Human language is so complex, variable (there are many different ways to express the same meaning), and polysemous (the same word or phrase may mean many things in different contexts) that NLP presents an enormous technical challenge. Decades of research have led to many specialized techniques each operating on language at different levels and on different isolated aspects of the language understanding task. Many of these techniques fall under the umbrella of text analytics for information purposes, and the associated natural language processing toolkits typically have, as a central component, a parser.

In most cases, a parser requires a lexicon which tends to be partitioned into a base (domain-independent) part, and a domain-dependent part. However, even lexicons which are characterized by a large inventory of domain-specific terms do not contain all possible domain terms. This is due to several factors including the fact that commonly used terms and expressions in a domain are constantly evolving and changing, or that just a subset of a text corpus resource was utilized to generate the lexicon. When a parser encounters single words or multiword terms which were not previously considered when the lexicon was built, it will suffer from lexical look-up failure, and/or misguided parse analysis.

SUMMARY

Embodiments include a system and computer program product for extraction of multiword lexical kernel units from a domain-specific lexical resource. According to an aspect, a candidate lexical kernel unit that includes a word token sequence having two or more words is received. Domain terms that contain the two or more words are retrieved from a terminology resource file of domain terms associated with a domain. The candidate lexical kernel unit and the retrieved domain terms are analyzed to determine whether the candidate lexical kernel unit satisfies specified criteria for use as a building block by a natural-language processing (NLP) tool for building larger lexical units in the domain. Each of the larger lexical units includes a greater number of words than the candidate lexical kernel unit. The candidate lexical kernel unit is identified as a lexical kernel unit based on determining that the candidate lexical kernel unit satisfies the specified criteria. The lexical kernel unit is output to a domain-specific lexical kernel unit file for input to the NLP tool.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
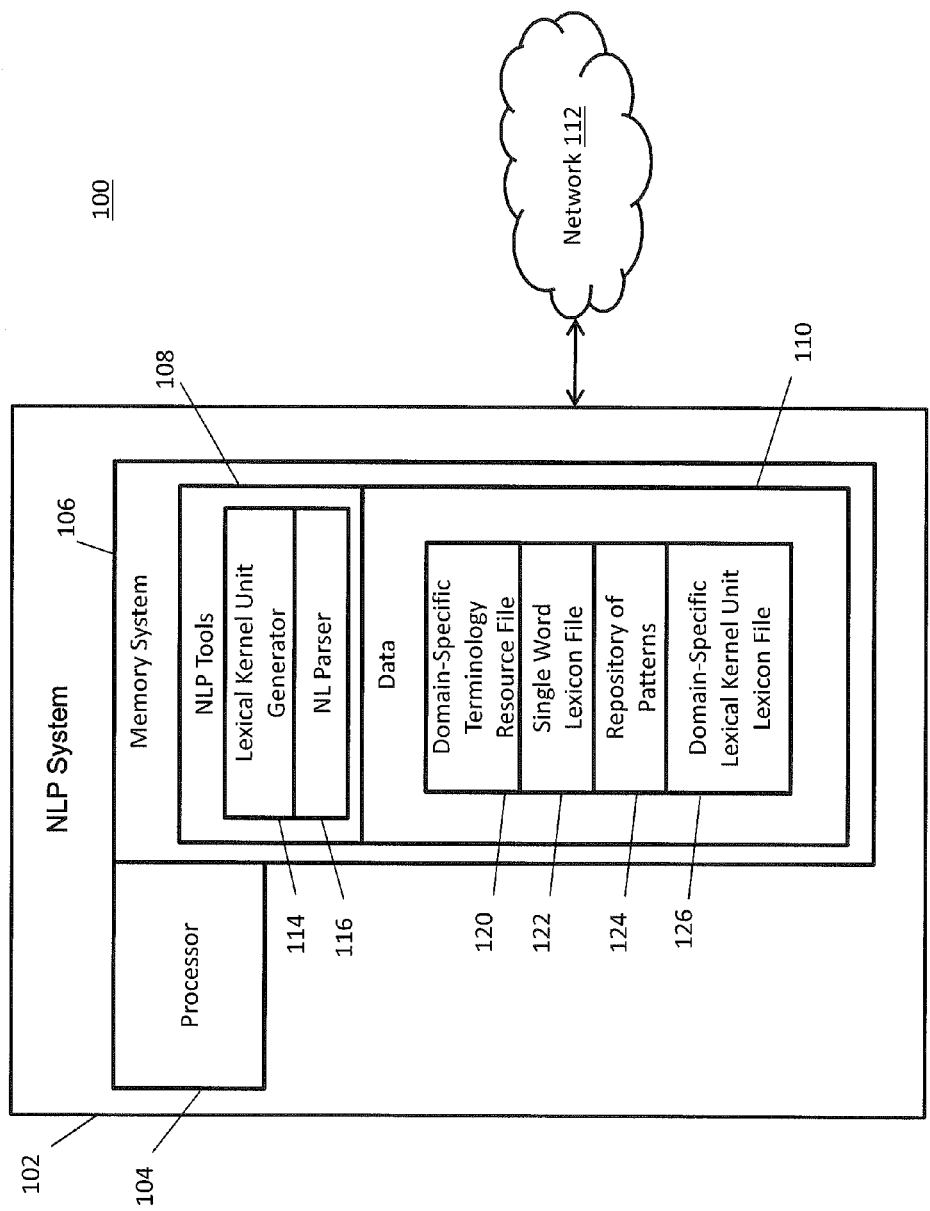
FIG. 1 depicts a block diagram of a system for forming domain-specific lexical kernel units in accordance with an embodiment.

To mitigate lexical lookup failures, which inevitably arise from the use of static lexica, embodiments described herein include a process for facilitating dynamic generation of domain-specific lexical entries. In embodiments, lexical kernel units are identified as building blocks from which an open-ended set of larger lexical entries can be compositionally built. The process described herein requires a set of well-formed multiword domain terms, such as those found in a terminology resource file. Such a resource file may be available by one or more of a variety of means such as, but not limited to: it may be available externally (as a domain ontology, or other domain index); derived from a well-formed domain-specific lexicon; or extracted (e.g. by text mining techniques) from a domain-representative corpus. Embodiments of the process can be used to find, within one or more terminology resource files, components (sub-sequences of words) which represent highly-lexicalized expressions representative of core domain concepts. Such expressions (e.g., in the medical field "family history", "spastic paraplegia", "Kallmann's syndrome") can function as building blocks for larger domain-descriptive terms compositionally derived from such lexical kernel units. For example, generative language devices will license e.g. "family history of spastic paraplegia", and "spastic paraplegia with Kallmann's syndrome" as domain-specific terms, available as such to a parser, even if these terms are absent from the static domain-dependent lexicon.

Embodiments disclosed herein relate to natural-language processing (NLP) and to the creation of an open-ended domain-specific lexicon by facilitating dynamic generation of domain-specific lexical entries. Open-endedness is provided by identifying lexical kernel units, with which larger lexical units can be compositionally built. Both the kernel and the larger lexical units are multiword expressions (also referred to as term phrases). The lexical kernel units become part of the domain-dependent lexicon. In contrast, the larger lexical units are not required to be part of, listed in, or integrated into, an existing lexicon, and they can be used as lexical resources for natural-language (NL) tools such as parsers and generators. Based on input that can include one or more terminology resource files containing domain terms (e.g., licensed domain terms) which can be viewed as word token sequences, as well as part-of-speech (POS) tags for the words in an entry and a pattern associated with each entry in the terminology resource file to be analyzed, embodiments can be used to generate a list of lexical kernel units, with each lexical kernel unit paired with linguistic information gathered during processing. An example of such linguistic information includes domain-specific usage features and lexical preferences. The identified lexical kernel units can be augmented with the linguistic data and then become part of a multi-word domain-specific lexicon.

Embodiments provide a process for creating a domain-specific lexicon with a minimal number of lexical kernel unit entries that describe the nature of a given domain, without having to cross over many data types. For example, there may be a terminology resource file with many different instantiations of "history of" such as ["family history of . . . ", "medical history of . . . ", and so forth] or ["history of panic disorder", "history of drug abuse", "history of falling", and so forth] but it is often undesirable to have to discover all of these, and can well be impossible to do so for every possible instantiation of the underlying pattern. Embodiments described herein simply capture the essence in a lexical kernel unit, described for example by the pattern '[adj] history (of [n])', where the pattern denotes that a word whose part-of-speech is 'adjective' precedes the word "history", itself followed by an "of" prepositional phrase, with a noun phrase placeholder indicated by '[n]'.

In an embodiment, lexical kernel units for a given domain are created by extracting word token sequences that meet specified criteria, from a terminology resource file for the given domain. The sequences of words that are extracted as lexical kernel units can be those that occur frequently together and where there exists a lexical atomic bond between the component parts. Embodiments described herein relax the notion of a lexicon made up of static entries by introducing the notion of lexical kernel units that capture the essence of a lexical unit and whose compositions are open to extensions and variations. Grammatical (non-lexical) rules of a language can thus be utilized to analyze and process longer multiword token sequences built regularly and compositionally around these lexical kernel units. In addition, embodiments can utilize lexical information collected during lexical kernel unit processing (e.g., extraction) in order to augment lexical information of lexical kernel unit component words listed in traditional static lexicons.

Examples that relate to the medical field are described herein; however, embodiments are not limited to applications in the medical field. Embodiments can be utilized by any application that uses a lexicon, such as a natural-language parser for a domain-specific question-answering (QA) system. A domain-specific QA system can target specific domains, such as call center support, agent assist, or customer support for particular products and/or services offered.

As one example, in the medical domain, the broad coverage offered by the Unified Medical Language System® (UMLS) knowledge base (KB) can be utilized. UMLS contains medical concepts, relations, and definitions, spread over millions of concepts from over 160 source vocabularies. Not all of these are domain terms. However, assuming a process which distils a UMLS-derived terminology resource file, lexical kernel units can be identified, extracted for the medical domain, and populated with language information, even though UMLS itself does not directly list such units.

In their appearance, lexical kernel units are multiword token sequences. The term "token sequence" or "word token sequence" as used herein refers to a broad range of language data including, but not limited to: formulaic expressions (e.g., "how are you?" or "hi there!"); adverbial phrases (e.g., "in here"); prepositional phrases (e.g., "in the evening of Jul. 7, 1999"); verbal collocations (e.g., "fall down"); nominal compounds (e.g., "withdrawal bleeding"); adjectival compounds (e.g., "mild to moderate to severe"); and high-frequency corpus-based clusters (e.g., "in the", "in which the", or "a very much documented"). Not all of the above are lexical kernel units. Some of them are domain-specific terms. Against this background of a wide range of entry types in some domain-specific terminology resource files, embodiments of the methods described herein are focused on finding the domain-specific lexical kernel units, as described previously, which some other independent NLP processes can use. Databases of lexical word token sequences are available, however many lexical word token sequences can be viewed as incorporating one, or more, lexical kernel units. In other words, part(s) of the lexical word token sequence tend(s) to be invariable while the remainder of the lexical word token sequence can vary. Once the lexical kernel units are identified they can be added to a lexicon for use in NLP.

The difficulty in extracting lexical kernel units from word token sequences is reflected in the many ways that these multiword strings are labeled in specialized discourse and in the range of data that fall under the umbrella of lexical word token sequences. The lexical word token sequences, or domain terms (e.g., licensed domain terms), sourced from a domain-specific terminology resource file can vary greatly in terms of form and function. Lexical word token sequences may vary in length (or number of component words). In an embodiment, to qualify as a lexical word token sequence, there must be at least two token words. A medical corpus can contain lexical token word sequence entries made up of as many as one thousand single words.

Lexical word token sequences cover a broad range of structural units and types. Consider (in examples from a UMLS-derived terminology resource file): verbal phrases ("skip beat") versus verbal collocations ("throw up"); noun phrases ("spastic paraplegia syndrome", "familial spastic paraplegia with neuropathy and poikiloderma") versus nominal collocations and compounds ("withdrawal bleeding", "familial sudden death", "popcorn calcification"); subjectless sentences ("does feed self", "can't get food down"); prepositional phrases with/without content ("due to cat hair", "in order to"); and so forth. In addition, there is a lack of distinction between grammatical and lexical units: some nominal phrases (such as "spastic paraplegia syndrome" and "language therapy for writing simple biographical information") are grammatically regular and semantically unexceptional (which makes them potential sources for identifying lexical kernel units as part of their structural make-up), while others (such as "withdrawal bleeding" and "morning after pill") present with some degree of lexical idiosyncrasy.

Examples also highlight that non-compositional semantics present in some token sequences ("popcorn calcification", "morning after pill") carry a metaphorical meaning that is absent in other token sequences ("withdrawal bleeding", "familial spastic paraplegia, mental retardation, and precocious puberty"). Further, some of the lexical word token sequences are string fragments because they have specialized programmatic relevance in that they reference a "to-be-filled" time/date ("do not fill before") or activity gap ("has difficulty doing"). Some lexical word token sequences might include verbatim texts or complete sentences. Therefore, the lexical kernel unit construction must account for both compositional and non-compositional (e.g., metaphorical) semantics present in various token sequences.

As referred to herein, a "lexical kernel unit" is an entry in a lexicon that includes pre-fabricated fixed sequences of words that can function in a domain-specific language as a whole, that is as if they were single-token words, and which can be used as lexical building blocks to construct larger lexical units that, if encountered themselves during lexicon creation time, would qualify for entry into the lexicon for use by NLP tools. Lexical kernel units tend to be invariable themselves, and also allow for compositions with certain words and other lexical kernel units. Lexical kernel units can have, among others, the following properties: they can display various degrees of semantic and syntactic opaqueness and transparency (however commonplace the lexical kernel units may be); operate as self-contained units; serve as atoms for the creation of novel, longer units which can reflect a more general property of grammar; constrain the substitutability of one lexical item by another of the same or similar category; and form part of domain-specific core vocabulary despite, in some cases, their grammaticality (i.e. regular internal structure).

Embodiments described herein can be implemented to isolate, extract, and acquire lexical kernel units from one or more domain-specific terminology resource files. Some such lexical kernel units will be found as entries, in their own right, in the input terminology resource file. Others will be identifiable within larger, and longer, entries in that file. In an embodiment, each multiword word token sequence in the terminology resource file is selected as a candidate lexical kernel unit starting with the shortest multiword token sequences (i.e., those of length two). In an embodiment, only those word token sequences of up to a threshold length are selected. In an embodiment, the multiword token sequences in the terminology resource file are sorted into an ordered list based on length and then alphabetized within each length, and the selection of candidate lexical kernel units starts at the top of the list and moves through the list in order. Embodiments described herein can focus on handling nominal and adjectival lexical kernel units, and in these embodiments, multiword sequences such as "throw up", "skip beat" or "has difficulty doing" are ignored and not selected as candidate lexical kernel units.

If a lexical kernel unit is not an entry in a terminology resource file, it may still be implicitly present, and identifiable, as a word token sequence participating in a set of larger entries in that file. For example, the lexical kernel unit "spastic paraplegia" can be inferred from a set of terminology resource file entries as exemplified below.

1. spastic paraplegia syndrome
2. spastic congenital paraplegia
3. spastic infantile paraplegia
4. familial spastic paraplegia with kallmann's syndrome
5. familial spastic paraplegia with neuropathy and poikiloderma
6. familial spastic paraplegia, mental retardation, and precocious puberty An examination of the six entries above shows that they all include the words "spastic" and "paraplegia"," in strings of varying length and with different nominal phrasal structures. In addition, the words "spastic" and "paraplegia" are not contiguous in two entries (#2 and #3), and three entries (#4-#6) share the contiguous word sequence "familial spastic paraplegia." Further, while "spastic paraplegia" is constant throughout, the phrases to the right in the sequences vary in entries #4-6. What appears on the right of "spastic paraplegia" can be a number of different phrase types, which themselves can be lexical kernel units. In fact, the token sequence in entry #6 can instantiate a series of three lexical kernel units in a coordination phrase; namely, "spastic paraplegia", "mental retardation" and "precocious puberty." Further, more background corpus data can be used to broaden the search for, and improve confidence of, additional putative lexical kernel units. A broader search performed on the substring "spastic paraplegia with" found in the sequences in entries #4 and #5 can return, for example, the strings "spastic paraplegia with amyotrophy of distal muscle wasting" and "spastic paraplegia with mental handicap." Additional entries like "spastic paraplegia with amyotrophy of hands and feet" can be found in a medical corpus, though the lexicon file built from the corpus does not list the lexical word token sequences "spastic paraplegia with amyotrophy of hands" or "spastic paraplegia with amyotrophy of feet." Another observation is that, in the medical corpus, there are no entries where "spastic paraplegia" co-occurs with a connector/preposition other than "with".

In embodiments described herein, in order to gain the status of lexical kernel unit (and thus be output in the final kernel unit lexicon), a candidate word token sequence must fulfill at least some combination of criteria that range from meeting some (adjustable) frequency threshold to satisfying linguistic constraints. Criteria can include, but is not limited to: (a) raw frequencies of occurrence of candidate kernel unit in input terminology resource file, (b) collocation calculations of mean, variance, and/or deviation (with an adjustable size window around a focal token) to determine the relationship between tokens in the candidate kernel unit, (c) raw frequencies of occurrence of candidate kernel unit in POS-based patterns, (d) selection preferences and restrictions (semantic-oriented constraints) across tokens in the candidate kernel unit, and/or (e) grammatical "well-formedness" of the candidate kernel unit. For example, the candidate kernel unit "spastic paraplegia" as a two-token sequence (bigram) has a frequency of exactly one in the input terminology resource file, i.e. "spastic paraplegia" happens to be listed as an entry in the terminology resource file used to extract kernel units. Further, data can be collected such as that a raw frequency of collocation, where "spastic" and "paraplegia" co-occur in domain terms longer than two-token sequences (bigrams), adds up to 377. Additional data can include that in 352 of these 377 sequences, "spastic" and "paraplegia" are contiguous tokens, and that in 25 of the 377 sequences, "spastic" is distributed either to the left or right of "paraplegia" with a window of at least one token. The fact that "spastic paraplegia" has a raw frequency of one in the input terminology resource file itself and the fact that "spastic" and "paraplegia" appear as contiguous tokens in 93.3% of the longer input domain terms with both "spastic" and "paraplegia" are weighed as strong evidence in support of the kernel-unit-like nature of "spastic paraplegia". Therefore, in embodiments it is not necessary to attempt to satisfy additional criteria.

Turning now to the multiword sequences in entries #2 and #3 "spastic congenital paraplegia" and "spastic infantile paraplegia" which have a gap, or intervening word ("congenital" and "infantile") between "spastic and paraplegia." The token words that make up a candidate kernel unit need not be contiguous in all domain term instantiations. In embodiment, the fact that "spastic" is removed from "paraplegia" is not evidence that "spastic paraplegia" is not a lexical kernel unit. Some n-token separation of a token from the focal word in the candidate kernel unit, i.e. the separation of the adjective "spastic" by one intervening token from the noun "paraplegia" in entries #2 and #3, is allowed to account for the fact that some token sequences in the input terminology resource file may be faulty and/or may have been gathered from sources with divergent terminology. Also, variability of collocation in candidate kernel units may reflect usage, language change, and/or the fact that they have not undergone complete lexicalization or become established domain-specific idioms.

Turning now to the multiword sequence "familial spastic paraplegia" found in entries #4-#6 and the determination of whether this three word token sequence should be a lexical kernel unit. In an embodiment, the determination can look at various frequencies and measures of variance and invariance (complementary and contrastive distributions) of the multiword sequence in the medical corpus, which in this case favors its lexical kernel unit nature and thus, "familial spastic paraplegia" can be identified as a lexical kernel unit. In this manner, lexical kernel units can be made up of expanded lexical kernel units.

Each lexical unit entry can either consist of the exact sequence of words contained within a domain term, or a subset of the words contained within a domain term. In the latter case, the subset need not be a contiguous span within the domain term. Finally, they can be included as smaller lexical kernel units within larger lexical kernel units.

While identifying a lexical kernel unit, some external resources can be used, one of which is a lexicon made up of single-word entries. During extraction of a lexical kernel unit from the multiword token sequences (in which the candidate kernel unit is an instantiated substring), linguistic information is gathered about the individual tokens that the longer sequences are made of. Structural patterns can also be "observed". The gathered linguistic information can be passed on to the structural head of the lexical kernel unit. Rather than letting the acquired language data about the headword of the lexical kernel unit be exclusively available to the lexical kernel unit lexicon, embodiments of the process can augment the corresponding words in the single-word lexicons with the gathered information as well. For example, the head "paraplegia" of the lexical kernel unit "spastic paraplegia" can be augmented with information that it co-occurs with the preposition "with" as found in #4-#5. The entry "paraplegia" in a single-word lexicon can also be augmented with that information. This language augmentation of single-word benefits parsing by providing structural preferences automatically "observed" from manipulating longer sequences. Percolating the information that the lexical kernel unit "spastic paraplegia" often occurs with the preposition "with" to the word "paraplegia" in a single-word lexicon can help the parser decide phrasal attachment in cases of structural ambiguity. The "with" prepositional phrase in "this neuron type of paraplegia with exaggerated ankle and knee jerks" is preferably attached to paraplegia" rather than to the word "type." As a general principle, in embodiments, the word in single-word lexicons, which corresponds to the head of a lexical kernel unit, can also inherit any language data gathered from analyzing the lexical word token sequences that are used as source data.

Using the principles described above, from the original terminology resource file, which includes sequences #1-#6 as shown above, the following smallest (bigram) and possibly-longer-than-2-word kernel units can be extracted by embodiments: "spastic paraplegia (with)"; "familial spastic paraplegia (with)"; "hereditary spastic paraplegia (with)."

Referring now to FIG. 1, a block diagram of a system 100 that includes a natural-language processing (NLP) system 102 is generally shown in accordance with an embodiment. The NLP system 102 can be implemented in a variety of computer systems, such as a server, a desktop computer, a workstation, a laptop computer, a tablet computer, a mobile device, and/or a cloud computing system. The NLP system 102 includes at least one processor 104 and a memory system 106 (also referred to as memory 106). The processor 104 can be any type of processing circuitry or microcontroller, including multiple instances thereof, that is configurable to execute processes further described herein, where the memory system 106 is an example of a tangible storage medium. The memory system 106 can include NLP tools 108, data 110, and other supporting programs (not depicted) such as an operating system, a script interpreter, a file management system, and the like. The NLP tools 108 may be partitioned as one or more computer program products. For example, the NLP tools 108 can include a lexical kernel unit generator 114 and a NL parser 116 among other executable applications (not depicted). As another example, the lexical kernel unit generator 114 can include a pattern-matching engine or a pattern-matching engine can be a separate application (not depicted) in the NLP tools 108. The data 110 can include a variety of records, files, and databases, such as a terminology resource file 120 of domain terms (e.g., licensed domain terms), a single-word lexicon file 122, a repository of patterns 124, a domain-specific lexical kernel unit lexicon file 126, and other data (not depicted) as further described herein.

In an exemplary embodiment, the processor 104 is coupled to the memory system 106. The processor 104 is configured to execute the lexical kernel unit generator 114 to analyze entries in the domain-specific terminology resource file 120, and to generate entries for the domain-specific lexical kernel unit lexicon file 126. The Unified Medical Language System® (UMLS) knowledge base (KB) is one example of a KB whereby, given a process to distill domain terms, entries relating to diseases, treatment, and symptoms can be identified. Other similarly structured KBs and processes may be used for other domains such that the domain-specific terminology resource file 120 includes a plurality of phrasal entries associated with a domain. The single word lexicon file 122 can be one or more files listing, respectively, domain-independent single-word terms (as in common English language words) and domain-dependent single word terms including part-of-speech information, syntactic, and semantic information. The single word lexicon file 122 typically starts off as existing computational lexicons and can be populated and further enhanced as the lexical kernel unit generator 114 processes more domain-specific terms from a terminology resource file 120. The single word lexicon file 122 can be included initially, but need not be, as the single word lexicon file 122 can be derived and populated through morphological decomposition of the domain terms in the terminology resource file 120. By the end of the process, the single word lexicon file 122 may list dynamically-generated lexical single words by virtue of processing sequences of word tokens from a given domain.

The repository of patterns 124 specifies the sequences of parts-of-speech with/without other lexical information, such as part-of-speech contours along with syntactic and/or semantic features. These patterns, collected by a process not described here, are harvested from domain-specific multiword terms since it is assumed that generic, domain-independent patterns are represented among the domain-dependent patterns. A "part-of-speech contour" refers to the sequence of part-of-speech tags that characterize word token sequences. Thus, for instance, "DET ADJ NOUN" is one such part-of-speech contour for a noun phrase. For each word token in a sequence (which underlies any given part-of-speech contour) there can be syntactic, and possibly semantic, features.

The domain-specific lexical kernel unit lexicon file 126 can be directly used by the NL parser 116, deployed for instance, as part of a domain-specific QA system. In embodiments, the domain-specific lexical kernel unit lexicon file 126 is used by the NL parser 116 which can handle the phrasal material around lexical kernel units. Thus, these longer phrases that include a lexical kernel unit do not need to be preserved as a whole as lexical multiword terms in a lexicon file. This method provides more generalized coverage for a given domain Although the NLP tools 108 and data 110 are depicted in the memory system 106 local to the processor 104, it will be appreciated that one or more portions of the NLP tools 108 and data 110 can be located remotely, e.g., across a network 112 that is accessible by the NLP system 102.

Figure 2:
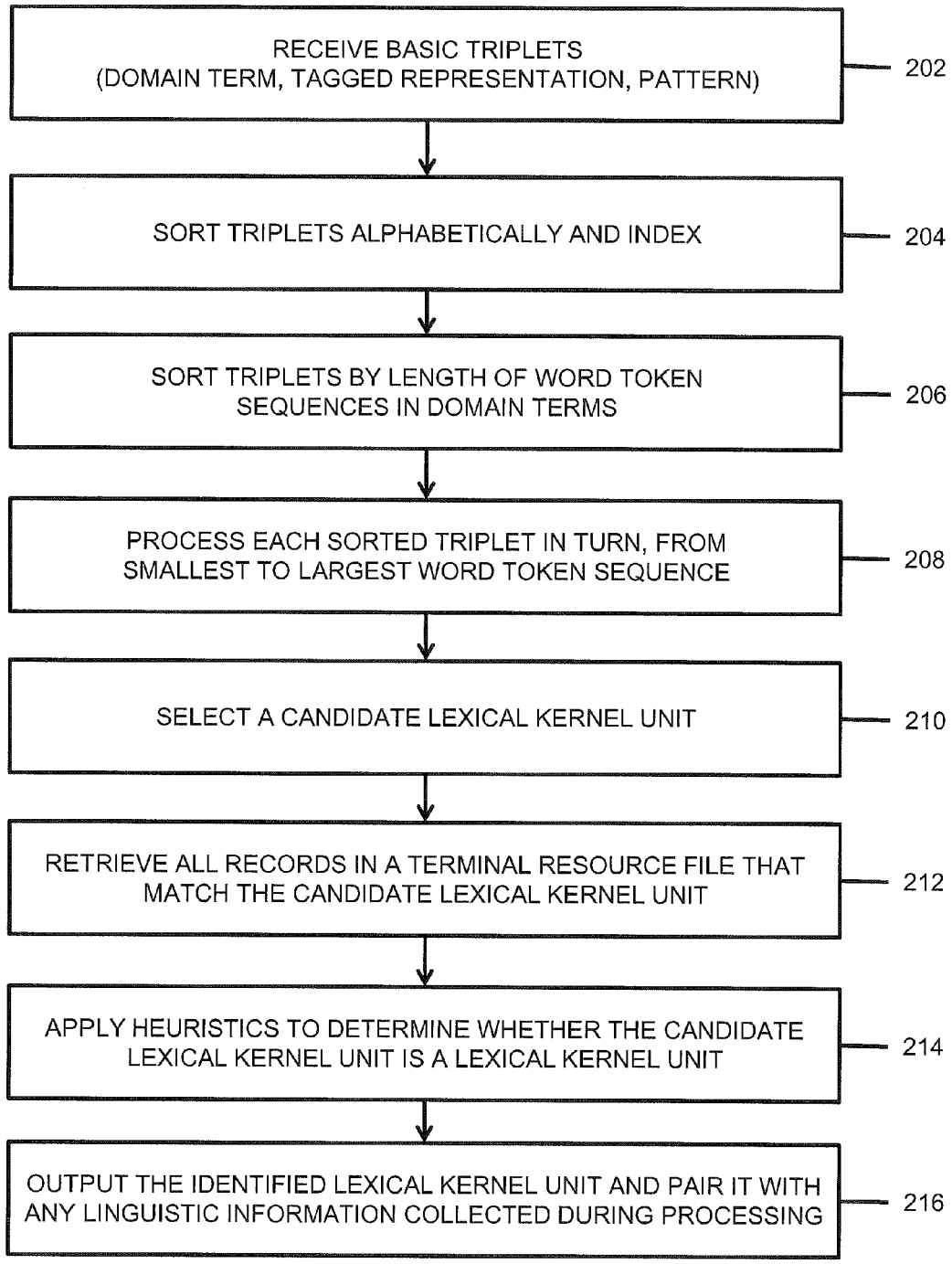
FIG. 2 depicts an example of a process flow for forming domain-specific lexical kernel units in accordance with an embodiment.

Referring now to FIG. 2, an example of a process flow for supplementing a lexicon with domain-specific lexical kernel units, such as those stored in the domain-specific lexical kernel unit lexicon file 126 is generally shown in accordance with an embodiment. For purposes of explanation, the process flow 200 is described in terms of the example of FIG. 1 but can be implemented on various system configurations. The processing described in FIG. 2 can be performed by an embodiment of the lexical kernel unit generator 114 shown in FIG. 1. Various pieces of data are received at block 202 to create basic triplets of information combining information from several files (e.g., the domain-specific terminology resource file 120, the single word lexicon file 122, and the repository of patterns 124). A basic triplet includes an alignment of a domain term together with its tagged representation and a part-of-speech-(POS) based pattern, which is an abstraction of the tagged representation. Examples of basic triplets in the medical field include:

| Licensed domain term | Simplified tagged representation | Pattern |
|---|---|---|
| anion gap | anion<noun singular> gap<headword noun singular> | <noun><noun> |
| familial spastic paraplegia | familial<adj>spastic<adj>paraplegia< headword noun singular> | <adj><adj><noun> |

At block 204, the triplets can be listed in one file or optionally structured and organized as records to facilitate indexing and cross-referencing of data during processing. Triplets are alphabetically listed by the first word of the domain term. At block 206, the data is sorted by word token sequence length (e.g., 2-token domain terms, 3-token domain terms, etc.). At block 208, each triplet anchored on the domain term is processed in turn from shortest word token sequence length to longest word token sequence length. To decide whether a domain term is a lexical kernel unit (i.e., whether it exhibits characteristics of a lexical kernel unit) tests such as those shown in FIG. 3 below can be applied. For example, raw frequency of occurrence can give an indication as to the commonality of a word token sequence. A single (or some other threshold number) occurrence of a word token sequence in a file of domain terms may or may not be enough to claim that the expression is a lexical kernel unit. In embodiments, the evidence used to determine the pivot-like nature of a word token sequence can be linguistic and collocational.

At block 210, the domain term of a triplet is selected as a candidate lexical kernel unit. At block 212, all domain terms in triplets that match the candidate lexical kernel unit are retrieved. In an embodiment this includes retrieving all tagged representations and patterns aligned with the domain terms in the domain-specific terminology resource file 120. For example, if the term "anion gap" has been selected at block 210 to be considered as a candidate lexical kernel unit, then the pattern of the term "anion gap" is overlaid against patterns previously collected and stored in the repository of patterns 124 This can result in:

A. "anion gap" original associated pattern <noun><noun>

B. Among the available longer patterns, <noun><noun> match subpatterns:

<adj><noun><noun>
<noun><noun><adj>
etc....

C. Overlaying compatible patterns in B results in:

<adj><kernel>
<kernel><adj>
etc.....

As exemplified by:

<adj><anion gap>
<anion gap><adj>
etc.....

At block 214, heuristics, such as those described previously herein and in the process of FIG. 3 below, are applied to the results of block 212 to determine whether the candidate lexical kernel unit is a lexical kernel unit that should be listed in the domain-specific lexical kernel unit file 126. Processing continues at block 216 where the identified lexical kernel unit is output (e.g., to the domain-specific lexical kernel unit file 126) and paired with any linguistic information collected during the process. In embodiments, the lexical kernel unit is output at least with a part-of-speech. Optional linguistic information indicating lexical frames and/or syntactic and semantic constraints and features can be listed in brackets. In the example above, if "anion gap" is determined to be a lexical kernel unit, then the output for storing in the domain-specific lexical kernel unit file 126 can include: [anion gap]: <noun>[prep:in><abbreviation><adj: abnormal, elevated, high, normal, venous>]. This output indicates that "anion gap" is a noun that favors the preposition "in", that it can be modified by some abbreviation, and that it favors the following adjectives "abnormal, elevated, high, normal, venous."

Blocks 210 through 216 can be performed for each entry, or domain term, in the domain-specific terminology resource file 120.

Figure 3:
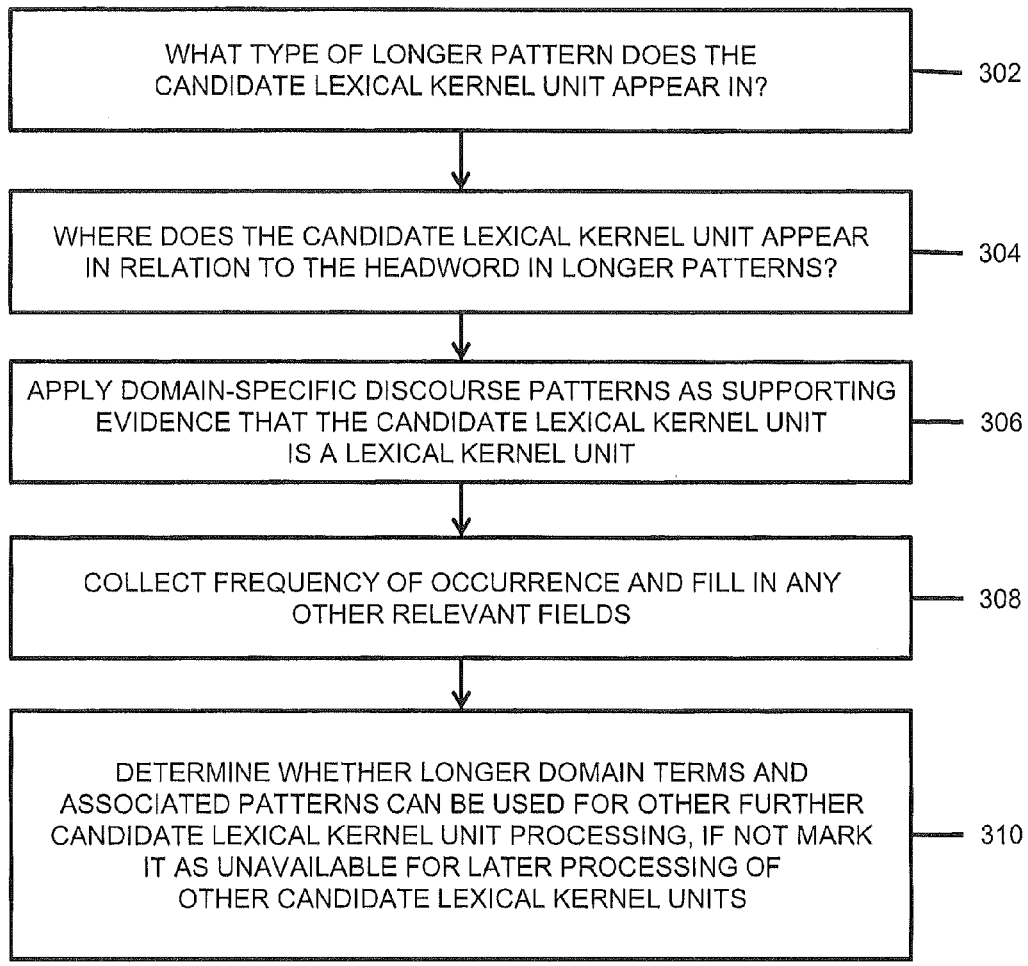
FIG. 3 depicts an example of a process flow for applying heuristics to identify lexical kernel units in accordance with an embodiment.

Turning now to FIG. 3, an example of a process flow for applying heuristics to determine whether a candidate lexical kernel unit should be identified as a lexical kernel unit is generally shown in accordance with an embodiment. In other embodiments, a subset or superset of the heuristics shown in FIG. 3 are applied. In other embodiments, the heuristics are applied in different order than that shown in FIG. 3. At block 302 of FIG. 3, a determination is made about what types (if any) of longer patterns the candidate lexical kernel unit appears in. For example, "spastic paraplegia" as <adj><noun> can be overlaid in longer patterns such as: <adj><adj><noun> construed as <adj><kernel>==<adj><spastic paraplegia>. "Spastic paraplegia" as a kernel unit can appear in longer patterns such as:

<adj><kernel>
<adj><adj><kernel>
<adj><adj><adj><kernel>
<kernel><adj>
<kernel><adj><adj>
<kernel><comma><adj><adj><adj> with instantiations such as:
familial spastic paraplegia
familial recessive spastic paraplegia
hereditary autosomal dominant spastic paraplegia
spastic paraplegia familial
spastic paraplegia familial recessive
spastic paraplegia, autosomal dominant familial The adjectives to the right and left show variability (i.e., various adjectival instantiations). While "spastic paraplegia" is constant, the adjective varies. Frequency counts of candidate kernel units (by pattern and total) can then be tallied.

As shown in FIG. 3, at block 304, it can be determined where the candidate lexical kernel unit appears in relation to the headword in longer patterns. When the candidate lexical kernel unit is to the left of a nominal term, as in <kernel><adj><noun> instantiated by "spastic paraplegia facial lesion", being removed from head "lesion" of the input term by an intervening adjective can be strong evidence in support of the kernel unit nature of the candidate "spastic paraplegia". In another example, when the candidate lexical kernel unit is to the right of a headword as in <noun><preposition><kernel> instantiated by "athetosis with spastic paraplegia", being removed by a preposition from the head "athetosis" in the input domain tem can also be strong evidence in support of the nature of the kernel unit "spastic paraplegia".

Domain-specific discourse patterns found, for example, in the repository of patterns 124, can be applied at block 306 as supporting evidence that the candidate lexical kernel unit is a lexical kernel unit. For example, in the pattern <kernel><noun>, some semantic features of the rightmost noun like "condition" or "illness" instantiated by "syndrome" in "spastic paraplegia syndrome" can be used as strong evidence in support of a candidate kernel unit status. In another example, when to left of identified headword as in <kernel><comma><adj><noun> instantiated by "spastic paraplegia, hereditary disorder", some domain-specific class features like condition and disorder for the word "disorder" (and comma-delimitation) can be used as strong evidence in support of the status of kernel unit for a candidate.

At block 308, various raw frequencies of occurrence and other measures such as those described above for the candidate lexical kernel unit can be collected. Referring to the data 110 in FIG. 1, the frequency may be based on contents of the domain-specific terminology resource file 120. Frequencies can be kept (e.g., total in source domain term lexicon, by patterns) and evidence indicators (1 for strong, 0 as default) can be added up. Thresholds used to turn a candidate lexical kernel unit into a lexical kernel unit for output to the domain-specific lexical kernel unit lexicon file 126 can be set to any number, even as low as zero. Different types of thresholds can have different tuning values. For example, it is possible that "spastic paraplegia" doesn't even show up as its own entry in the terminology resource file (as a domain term), but that wouldn't necessarily prevent it from being a kernel unit (e.g., because "spastic paraplegia" shows up very frequently as collocational words in other domain terms).

At block 310 a determination is made about whether one, or more, longer domain terms and associated patterns can be used for other further candidate lexical kernel unit processing. If a longer domain term cannot be further used for candidate lexical kernel unit processing then it is marked as unavailable.

Embodiments described herein leverage implicit measures of various frequencies and mutual expectations (collocations) of words in any domain-specific lexicon. A domain-specific lexicon can include entries made up of groups of words that appear in the domain more often together than would be expected by chance. Patterning of part-of-speech word sequences and phrases can be construed as collocational frameworks which can be independently developed for extraction and acquisition of domain-specific lexicon, and stored as the domain-specific lexical kernel unit file. In embodiments lexical kernel units are limited to strings that are less than a threshold number of words. In other embodiments the total number of lexical kernel units is limited to a threshold number of kernel units.

Embodiments can include an iterative-based lexicon generator that includes a processing pass to separate, and ultimately exclude entries that do not meet some data types or other criteria. This iterative process can separate the results into different buckets of triplets by length (number of token words in a term). The content of each bucket can be processed so as to exclude entries that are not possible lexical kernel units. For example, in an embodiment, all terms which have the annotated (simplified) patterns [<noun><preposition><noun>] and [<noun><preposition><noun><preposition><noun>] can be removed from the three-word and five-word buckets, respectively. Then, if the information is not already part of the noun lexical specification in the single-word lexicon, the lexical data of the noun to the left of the preposition can be augmented with the specific preposition. For example, the entry "excision of growth on abdomen" can be deleted from the five-word bucket while "excision" and "growth" are augmented with prepositions "excision (of)" and "growth (on)" in the single-word lexicon.

Figure 4A:
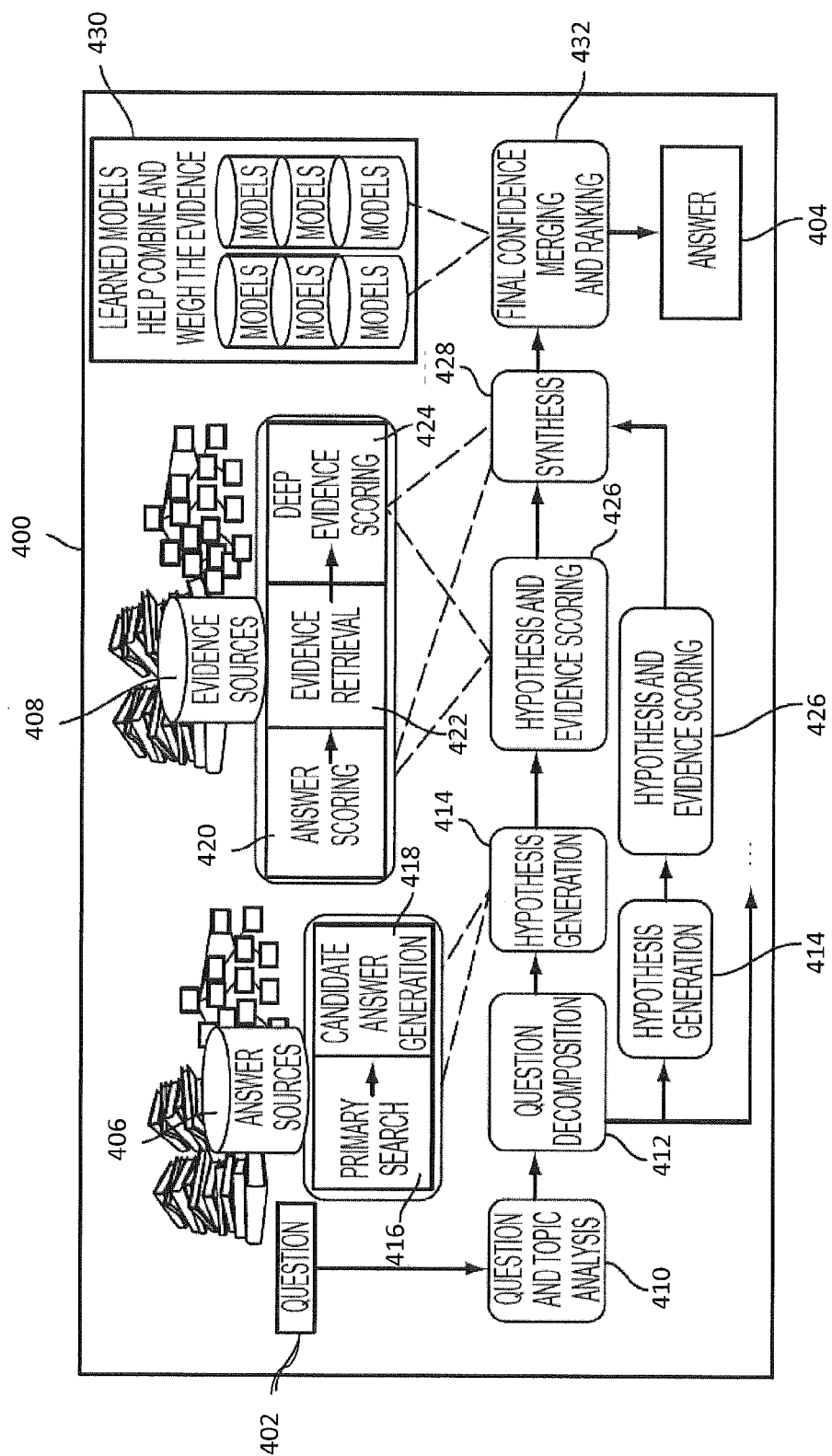
FIG. 4A depicts a high-level block diagram of a question-answer (QA) framework where embodiments of the domain-specific lexical kernel units can be utilized.

Turning now to FIG. 4A, a high-level block diagram of a question-answer (QA) framework 400 where embodiments described herein can be utilized is generally shown. The QA framework 400 can be implemented on a separate computer system from the NLP system 102 of FIG. 1 or may be executed on the NLP system 102 but separately from the lexical kernel unit generator 114 of FIG. 1. In general, the QA framework 400 is operable after the lexical kernel unit generator 114 of FIG. 1 creates one or more instances of the domain-specific lexical kernel unit file 126 of FIG. 1 for use by the NL parser 116 of FIG. 1.

The QA framework 400 can be implemented to generate a ranked list of answers 404 (and a confidence level associated with each answer) to a given question 402. In an embodiment, general principles implemented by the framework 400 to generate answers 404 to questions 402 include massive parallelism, the use of many experts, pervasive confidence estimation, and the integration of shallow and deep knowledge. In an embodiment, the QA framework 400 shown in FIG. 4A is implemented by the Watson™ product from IBM.

The QA framework 400 shown in FIG. 4A defines various stages of analysis in a processing pipeline. In an embodiment, each stage admits multiple implementations that can produce alternative results. At each stage, alternatives can be independently pursued as part of a massively parallel computation. Embodiments of the framework 400 don't assume that any component perfectly understands the question 402 and can just look up the right answer 404 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 4A, the question and topic analysis 410 is performed and used in question decomposition 412. Hypotheses are generated by the hypothesis generation block 414 which uses input from the question decomposition 412, as well as data obtained via a primary search 416 through the answer sources 406 and candidate answer generation 418 to generate several hypotheses. Hypothesis and evidence scoring 426 is then performed for each hypothesis using evidence sources 408 and can include answer scoring 420, evidence retrieval 422 and deep evidence scoring 424.

A synthesis 428 is performed of the results of the multiple hypothesis and evidence scorings 426. Input to the synthesis 428 can include answer scoring 420, evidence retrieval 422, and deep evidence scoring 424. Learned models 430 can then be applied to the results of the synthesis 428 to generate a final confidence merging and ranking 432. A ranked list of answers 404 (and a confidence level associated with each answer) is then output.

Figure 4B:
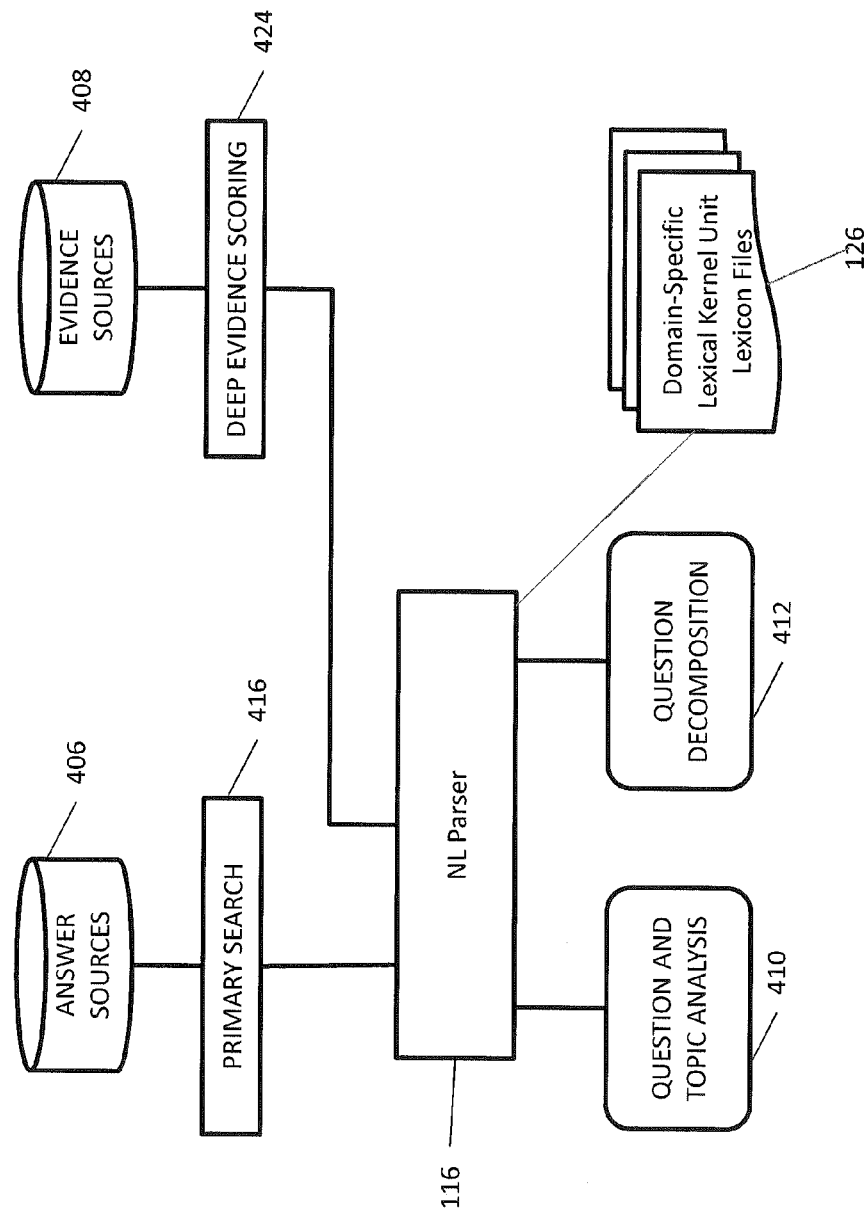
FIG. 4B depicts uses of domain-specific lexical kernel units by the QA framework of FIG. 4A in accordance with an embodiment.

The QA framework 400 shown in FIG. 4A can utilize embodiments of the NL parser 116 of FIG. 1 in combination with one or more instances of domain-specific lexical kernel unit files 126 of FIG. 1 described herein to parse the answer sources 406 and the evidence sources 408 as part of the primary search 416 and deep evidence scoring 424 as depicted in greater detail in FIG. 4B. The NL parser 116 can also utilize the domain-specific lexical kernel unit files 126 as part of question and topic analysis 410 and question decomposition 412 as depicted in FIG. 4B. The NL parser 116 in combination with one or more instances of the domain-specific lexical kernel unit file 126 may also be used by other elements of the QA framework 400. The efficiency and effectiveness of the NL parser 116 may be directly impacted by the accuracy and breadth of coverage in the domain-specific lexical kernel unit files 126 as populated by the lexical kernel unit generator 114 of FIG. 1.

Figure 5:
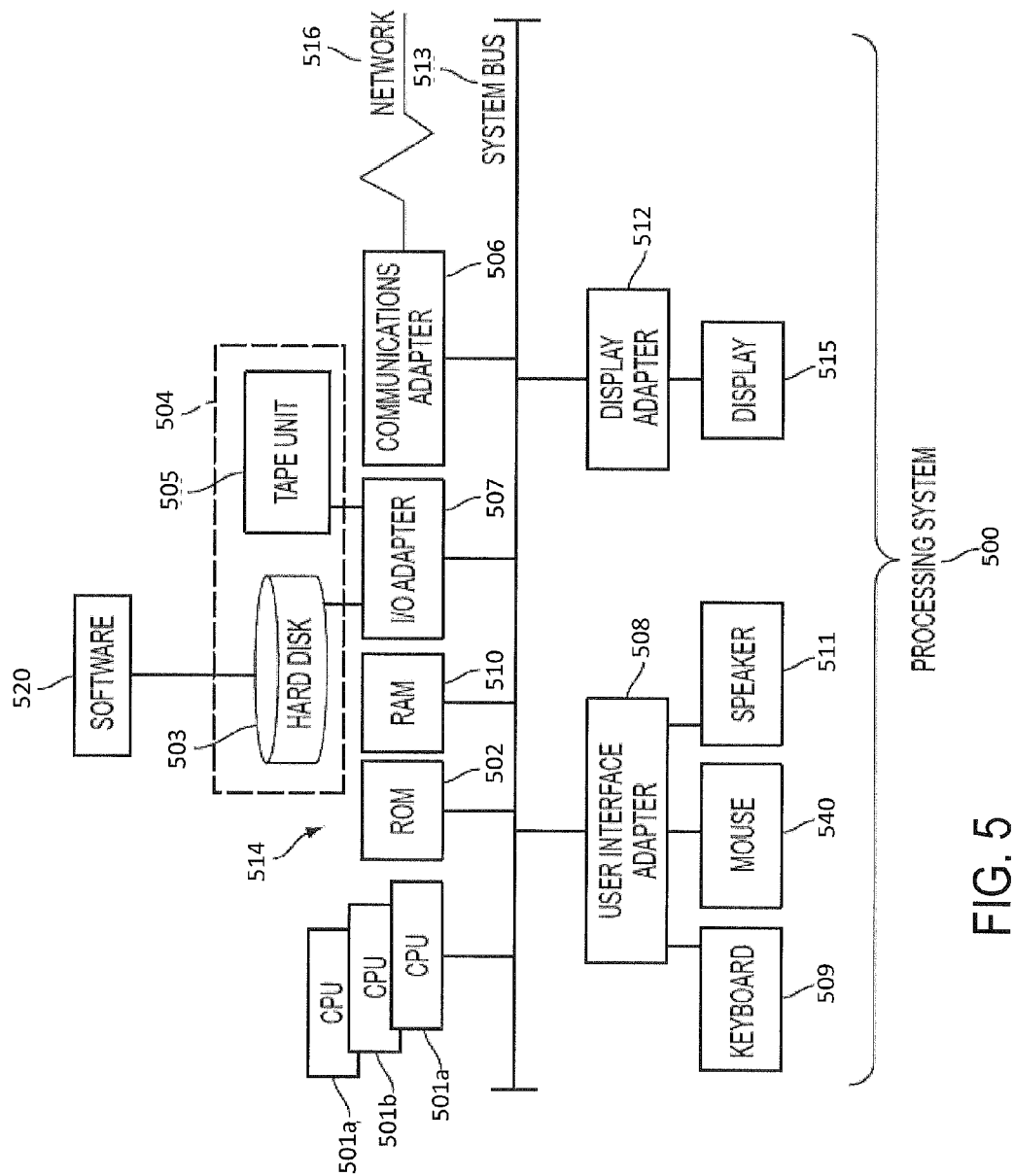
FIG. 5 depicts a processing system in accordance with an embodiment.

Referring now to FIG. 5, there is shown an embodiment of a processing system 500 for implementing the teachings herein. In this embodiment, the processing system 500 has one or more central processing units (processors) 501a, 501b, 501c, etc. (collectively or generically referred to as processor(s) 501). Processors 501, also referred to as processing circuits, are coupled to system memory 514 and various other components via a system bus 513. Read only memory (ROM) 502 is coupled to system bus 513 and may include a basic input/output system (BIOS), which controls certain basic functions of the processing system 500. The system memory 514 can include ROM 502 and random access memory (RAM) 510, which is read-write memory coupled to system bus 513 for use by processors 501.

FIG. 5 further depicts an input/output (I/O) adapter 507 and a network adapter 506 coupled to the system bus 513. I/O adapter 507 may be a small computer system interface (SCSI) adapter that communicates with a hard disk 503 and/or tape storage drive 505 or any other similar component. I/O adapter 507, hard disk 503, and tape storage drive 505 are collectively referred to herein as mass storage 504. Software 520 for execution on processing system 500 may be stored in mass storage 504. The mass storage 504 is an example of a tangible storage medium readable by the processors 501, where the software 520 is stored as instructions for execution by the processors 501 to perform a method, such as the process flows shown in FIGS. 2-3. Network adapter 506 interconnects system bus 513 with an outside network 516 enabling processing system 500 to communicate with other such systems. A screen (e.g., a display monitor) 515 is connected to system bus 513 by display adapter 512, which may include a graphics controller to improve the performance of graphics intensive applications and a video controller. In one embodiment, adapters 507, 506, and 512 may be connected to one or more I/O buses that are connected to system bus 513 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 513 via user interface adapter 508 and display adapter 512. A keyboard 509, mouse 540, and speaker 511 can be interconnected to system bus 513 via user interface adapter 508, which may include, for example, a Super I/O chip integrating multiple device adapters into a single integrated circuit.

Thus, as configured in FIG. 5, processing system 500 includes processing capability in the form of processors 501, and, storage capability including system memory 514 and mass storage 504, input means such as keyboard 509 and mouse 540, and output capability including speaker 511 and display 515. In one embodiment, a portion of system memory 514 and mass storage 504 collectively store an operating system to coordinate the functions of the various components shown in FIG. 5.

Technical effects and benefits include the ability to incorporate into a lexicon lexical multiword terms that can serve as the minimal multiword pivots around which longer grammatically-regular terms are built. However, it is the task of a NL parser to analyze these longer terms. This method of kernel unit identification populates domain-specific lexicons without overloading the lexicon and crossing over many data types. Embodiments can also be used to explain observed variations among entries found in the input domain terms. Technical effects and benefits also include the creation of domain-specific lexical kernel unit files to improve the performance of a natural-language parser targeting an associated domain. Efficient creation of a domain-specific lexical kernel unit file reduces turnaround time when incorporating updates. Embodiments may also reduce effort for domain adaption of a lexicon file. Domains targeted by the domain-specific lexical kernel unit file can be adapted to provide a greater breadth of coverage by a NL parser.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising:
   a tangible storage medium readable by a processor and storing instructions for execution by the processor to perform a method comprising:
   receiving a candidate lexical kernel unit comprising a word token sequence that includes two or more words;
   retrieving domain terms that contain the two or more words from a terminology resource file of domain terms associated with a domain;
   analyzing the candidate lexical kernel unit and the retrieved domain terms to determine whether the candidate lexical kernel unit satisfies specified criteria for use as a building block by a natural-language processing (NLP) tool for building larger lexical units in the domain, each of the larger lexical units including a greater number of words than the candidate lexical kernel unit;
   identifying the candidate lexical kernel unit as a lexical kernel unit based on determining that the candidate lexical kernel unit satisfies the specified criteria; and
   outputting the lexical kernel unit to a domain-specific lexical kernel unit file for input to the NLP tool for use as a lexical resource in parsing natural language text in the domain, the parsing including identifying domain-specific terms in the natural language text in the domain.

2. The computer program product of claim 1, wherein linguistic information collected during the analyzing is further output based on determining that the candidate lexical kernel unit satisfies the specified criteria.

3. The computer program product of claim 1, wherein the specified criteria includes the number of domain terms retrieved from the terminology resource file.

4. The computer program product of claim 1, wherein the specified criteria includes one or more types of patterns in the retrieved domain terms.

5. The computer program product of claim 1, wherein at least two of the two or more words included in the candidate lexical kernel unit are not contiguous in least one of the retrieved domain terms.

6. The computer program product of claim 1, wherein the analyzing is based on heuristics.

7. The computer program product of claim 1, wherein
   the retrieved domain terms are each part of an entry in the terminology resource file that includes a domain term, a tagged entry that identifies a headword in the entry, and an entry pattern that identifies a part-of-speech in the entry, and
   the entry is input to the analyzing.

8. The computer program product of claim 1, wherein the method further comprises repeating the receiving, retrieving, analyzing, identifying, and outputting for additional candidate lexical kernel units.

9. A system comprising:
   a memory having computer readable instructions; and
   a processor for executing the computer readable instructions, the computer readable instructions including:
   receiving a candidate lexical kernel unit comprising a word token sequence that includes two or more words;
   retrieving domain terms that contain the two or more words from a terminology resource file of domain terms associated with a domain;
   analyzing the candidate lexical kernel unit and the retrieved domain terms to determine whether the candidate lexical kernel unit satisfies specified criteria for use as a building block by a natural-language processing (NLP) tool for building larger lexical units in the domain, each of the larger lexical units including a greater number of words than the candidate lexical kernel unit;
   identifying the candidate lexical kernel unit as a lexical kernel unit based on determining that the candidate lexical kernel unit satisfies the specified criteria; and
   outputting the lexical kernel unit to a domain-specific lexical kernel unit file for input to the NLP tool for use as a lexical resource in parsing natural language text in the domain, the parsing including identifying domain-specific terms in the natural language text in the domain.

10. The system of claim 9, wherein linguistic information collected during the analyzing is further output based on determining that the candidate lexical kernel unit satisfies the specified criteria.

11. The system of claim 9, wherein the specified criteria includes at least one of the number of domain terms retrieved from the terminology resource file and one or more types of patterns in the retrieved domain terms.

12. The system of claim 9, wherein
   the retrieved domain terms are each part of an entry in the terminology resource file that includes a domain term, a tagged entry that identifies a headword in the entry, and an entry pattern that identifies a part-of-speech in the entry, and
   the entry is input to the analyzing.

* * * * *